(12) United States Patent
Fujimoto et al.

(10) Patent No.: US 10,265,797 B2
(45) Date of Patent: Apr. 23, 2019

(54) RESISTANCE SPOT WELDING METHOD

(71) Applicant: NIPPON STEEL & SUMITOMO METAL CORPORATION, Tokyo (JP)

(72) Inventors: Hiroki Fujimoto, Tokyo (JP); Hatsuhiko Oikawa, Tokyo (JP); Shintaro Yamanaka, Tokyo (JP)

(73) Assignee: Nippon Steel & Sumitomo Metal Corporation, Tokyo (JP)

( * ) Notice: Subject to any disclaimer, the term of this patent is extended or adjusted under 35 U.S.C. 154(b) by 47 days.

(21) Appl. No.: 14/902,985

(22) PCT Filed: Jun. 26, 2014

(86) PCT No.: PCT/JP2014/067083
§ 371 (c)(1),
(2) Date: Jan. 5, 2016

(87) PCT Pub. No.: WO2015/005134
PCT Pub. Date: Jan. 15, 2015

(65) Prior Publication Data
US 2016/0144451 A1    May 26, 2016

(30) Foreign Application Priority Data
Jul. 11, 2013   (JP) ................................ 2013-145380

(51) Int. Cl.
*B23K 11/24* (2006.01)
*B23K 11/16* (2006.01)
(Continued)

(52) U.S. Cl.
CPC ........... *B23K 11/245* (2013.01); *B23K 11/115* (2013.01); *B23K 11/16* (2013.01); *B23K 2101/18* (2018.08); *B23K 2103/04* (2018.08)

(58) Field of Classification Search
CPC ..... B23K 11/115; B23K 11/16; B23K 11/245; B23K 2201/18; B23K 2203/04
(Continued)

(56) References Cited

U.S. PATENT DOCUMENTS

| 5,483,035 A | 1/1996 | Kawai et al. |
| 2011/0303655 A1* | 12/2011 | Kanai .................... B23K 11/115 |
| | | 219/660 |
| 2012/0141829 A1 | 6/2012 | Oikawa et al. |

FOREIGN PATENT DOCUMENTS

| JP | 07-303973 | 11/1995 |
| JP | 2003-236674 | 8/2003 |

(Continued)

OTHER PUBLICATIONS

English translation of RU 2 243 071 C2 (Dec. 27, 2004).
(Continued)

*Primary Examiner* — Dana Ross
*Assistant Examiner* — James F Sims, III
(74) *Attorney, Agent, or Firm* — Birch, Stewart, Kolasch & Birch, LLP

(57) ABSTRACT

A resistance spot welding method including: a pulsation process of clamping a sheet assembly of two or more overlapped steel sheets including at least one high tensile steel sheet using a pair of welding electrodes that are connected to a spot welding power source employing an inverter direct current method, and performing plural repetitions of current passing and current pass stopping, while pressing the steel sheets with the welding electrodes; and a continuous current pass process in which, after the pulsation process, current is passed continuously for a longer period of time than a maximum current pass time of the pulsation process, while pressing the steel sheets with the welding electrodes.

11 Claims, 12 Drawing Sheets

(51) Int. Cl.
*B23K 11/11* (2006.01)
*B23K 101/18* (2006.01)
*B23K 103/04* (2006.01)

(58) Field of Classification Search
USPC .......................................................... 219/92
See application file for complete search history.

(56) References Cited

FOREIGN PATENT DOCUMENTS

| JP | 2006-181621 | 7/2006 |
| JP | 2010-172946 | 8/2010 |
| JP | 2010-188408 | 9/2010 |
| JP | 2010-207909 | 9/2010 |
| JP | 2010-247215 A | 11/2010 |
| JP | 4728926 B2 | 4/2011 |
| JP | 2012-030274 | 2/2012 |
| JP | 2012-30274 A | 2/2012 |
| JP | 2013-086158 | 5/2013 |
| KR | 2012-0001126 A | 1/2012 |
| RU | 2 243 071 C2 | 12/2004 |
| SU | 197796 A | 6/1967 |
| SU | 354954 | 10/1972 |

OTHER PUBLICATIONS

English translation of SU 197796 A (Jun. 9, 1967).
English translation of SU 354954 (Oct. 16, 1972).
Database WPI, Week 201210, Thomson Scientific, GB; AN 2012-A85433, XP002768207, KR 2012-0001126 A, Jan. 4, 2012.
Extended European Search Report dated Mar. 24, 2017, in European Patent Application No. 14823032.9.
Notice of Reasons for Rejection dated Oct. 18, 2016, in Japanese Patent Application No. 2015-526251, with English translation.
Russian Office Action and Search Report dated Mar. 16, 2017 for Application No. 2016101225/02, along with an English translation thereof.
Korean Office Action for Appl. No. 10-2016-7001464 dated Mar. 22, 2018 (w/ English translation).

* cited by examiner

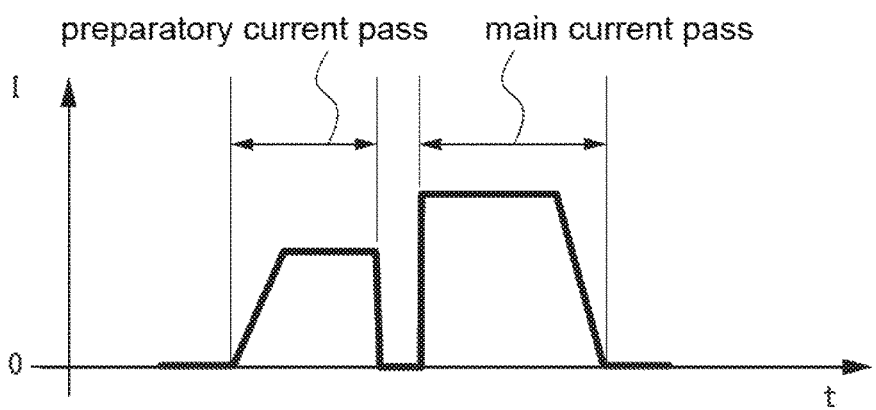
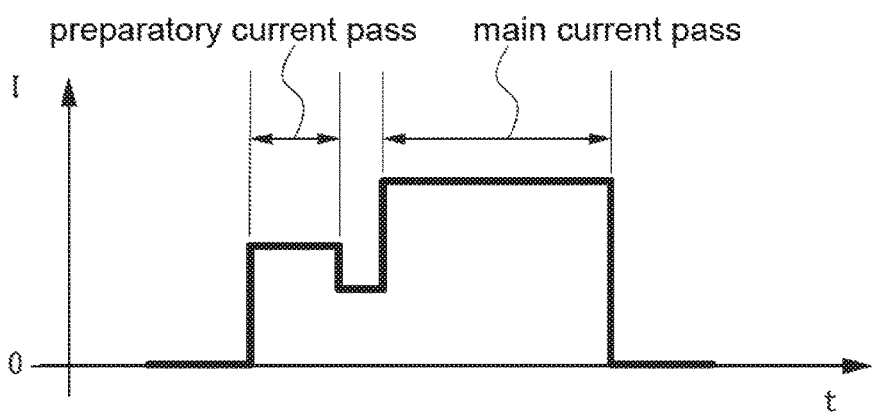

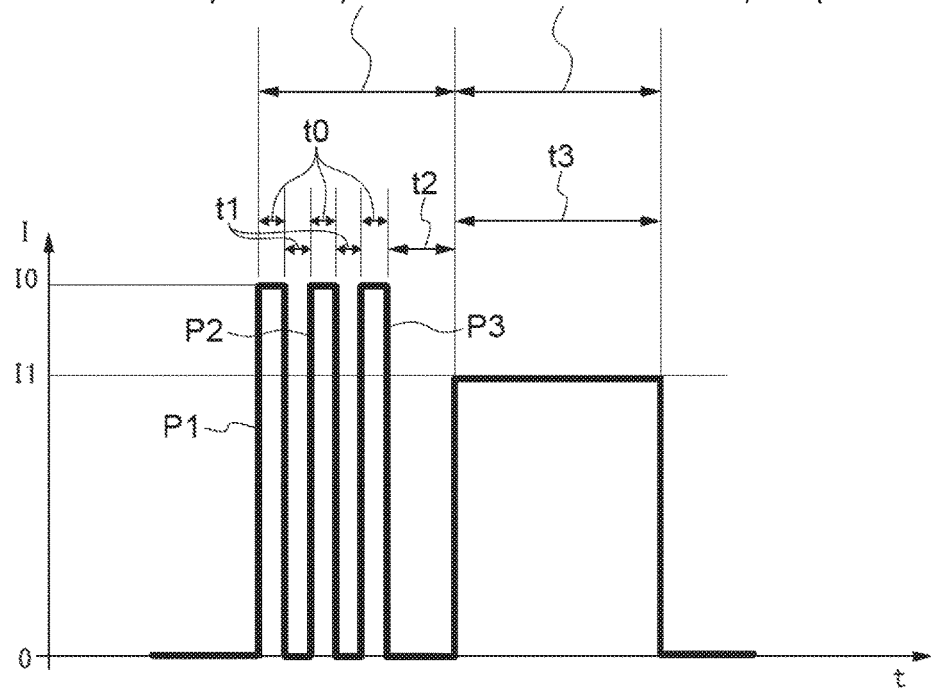

RESISTANCE SPOT WELDING METHOD

CROSS-REFERENCE TO RELATED APPLICATIONS

This application is a national stage application of International Application No. PCT/JP2014/067083, filed Jun. 26, 2014, which is incorporated herein by reference in its entirety, and which claims priority to Japanese Patent Application No. 2013-145380, filed on Jul. 11, 2013.

TECHNICAL FIELD

The present invention relates to a resistance spot welding method.

BACKGROUND ART

Automobile vehicle bodies are mainly assembled by joining pressed steel sheets together using spot welding. In spot welding used to assemble vehicle bodies, there are demands both to secure a nugget diameter according to the sheet thickness, and to suppress the occurrence of sputter.

Sputter includes internal sputter (a phenomenon in which parent metal that has been melted by welding is scattered from the superimposed faces of the steel sheets) and surface sputter (a phenomenon in which parent metal that has been melted by welding is scattered from contact surfaces between the steel sheet and the electrodes). In both cases, the surface quality of the vehicle body is impaired by the sputter scattering and adhering to the automobile vehicle body. Sputter adhering to moving parts of a welding robot is also a cause of equipment malfunction. Needle shaped surface sputter remaining on the spot weld surface causes damage to automobile wiring harnesses and the like, and therefore needs to be ground off with a grinder. There is accordingly a demand to avoid internal sputter and surface sputter, as well as to secure a specific standard nugget diameter in order to secure the required weld joint strength.

In vehicle body assembly, sometimes the nugget diameter is less than the standard nugget diameter due to various disturbance factors such as electrode wear, current forking to an existing weld point, gaps between pressed components, and the like. It is accordingly often necessary, when welding on a production line so as not to cause sputter to occur, to make the appropriate current range 1.0 kA or greater, or 1.5 kA or greater in test sample level evaluation.

Recently, there is increasing use in automobile assembly of resistance spot welding machines that use an inverter direct current method in place of a single phase alternating current method. Inverter direct current methods enable the transformer to be made small, with the advantage that installation to a robot that only has a small carrying weight capacity is possible, and so inverter direct current methods are often used particularly on automated lines.

Inverter direct current methods have a high heat generation efficiency due to imparting a continuous current, without switching the current ON and OFF as in conventionally employed single phase alternating current methods. There are, accordingly, reports of forming nuggets of the standard nugget diameter or greater using a low current, and of wider appropriate current ranges for than when using a single phase alternating current, even in cases in which zinc plated thin soft steel sheet material is employed that does not readily form nuggets.

In spot welding, as illustrated in FIG. 1, often resistance spot welding is employed in automobiles using a single stage current pass in which electricity is only passed one time. In FIG. 1, I on the vertical axis is the weld current, and t on the horizontal axis is time (the same applies to FIG. 2 to FIG. 7). However, the current value at which internal sputter is generated by welding using a single stage current pass is low with high tensile steel sheets using an inverter direct current method, and there is significant narrowing of the appropriate current range.

Japanese Patent Application Laid-Open (JP-A) No. 2010-188408 (sometimes referred to below as "Document 1") describes a method to suppress the generation of sputter in spot welding of high tensile steel sheets by, as illustrated in FIG. 2, employing a two stage current pass method in which the main current pass is performed after the conformity has been raised between contacting faces of steel sheets by using a preparatory current pass.

JP-A No. 2003-236674 (sometimes referred to below as "Document 2") describes a method to suppress the generation of sputter in spot welding of high tensile steel sheets by, as illustrated in FIG. 3, employing a current pass method in which a preparatory current pass is employed to raise the conformity between contacting faces of steel sheets, current passing is then stopped, and then the main current pass is performed.

JP-A No. 2010-207909 (sometimes referred to below as "Document 3") describes employing a current pass method in which, as illustrated in FIG. 4 and FIG. 5, a preparatory current pass is employed to raise the conformity between contacting faces of steel sheets, the current value is then lowered, and then the current value is raised again, and main current pass is performed at a constant current, or a pulse main current pass is performed. The suppression of sputtering from occurring thereby in spot welding of high tensile steel sheets is described therein.

JP-A No. 2006-181621 (sometimes referred to below as "Document 4") describes a method to suppress sputtering from occurring in spot welding of high tensile steel sheets by spot welding as the current value is increased, while repeatedly raising and lowering the current, as illustrated in FIG. 6.

A document "ISO 18278-2 Resistance Welding and Weldability—Part 2 Alternative procedure for the assessment of sheet steels for spot welding" (sometimes referred to below as "Document 5") describes a spot welding method in which, as illustrated in FIG. 7, for steel sheets of sheet thickness 1.5 mm or greater, six cycles (120 milliseconds) or more of current pass and two cycles (40 milliseconds) of rest are repeated three times or more.

SUMMARY OF INVENTION

Technical Problem

An object of the present invention is to provide a resistance spot welding method for sheet assemblies of overlapped steel material including a high tensile steel sheet, the method enabling a wide appropriate current range to be secured, even when using an inverter direct current method.

Solution to Problem

As a specific example of such a method, the inventors have investigated employing surface treated 1500 MPa grade hot stamp steel sheet in various sheet assemblies. As a result, they have discovered that stable spot welding, in which internal sputtering and surface sputtering is suppressed and having a wide appropriate current range, can be implemented by combining a process in which a pulsating current is passed for a short period of time (plural repetitions of current pass and current pass stop), followed by a continuous current pass process.

An aspect of the present invention provides a resistance spot welding method including: a pulsation process of clamping a sheet assembly of two or more overlapped steel sheets including at least one high tensile steel sheet using a pair of welding electrodes that are connected to a spot welding power source employing an inverter direct current method, and performing plural repetitions of current passing and current pass stopping, while pressing the steel sheets with the welding electrodes; and a continuous current pass process in which, after the pulsation process, current is passed continuously for a longer period of time than a maximum current pass time of the pulsation process, while pressing the steel sheets with the welding electrodes.

Advantageous Effects of Invention

The resistance spot welding method of the present invention enables a wide appropriate current range to be secured, even in cases in which an inverter direct current source is employed to perform spot welding of sheet assemblies of overlapped steel sheet including a high tensile steel sheet.

BRIEF DESCRIPTION OF DRAWINGS

FIG. 3 is an explanatory diagram schematically illustrating a relationship between time and weld current in a current pass method of Document 2.

FIG. 4 is an explanatory diagram schematically illustrating a relationship between time and weld current in a current pass method of Document 3.

FIG. 9 is an explanatory diagram schematically illustrating a relationship between time and weld current in a current pass method of a resistance spot welding method according to an exemplary embodiment of the present invention.

DESCRIPTION OF EMBODIMENTS

Figure 1:
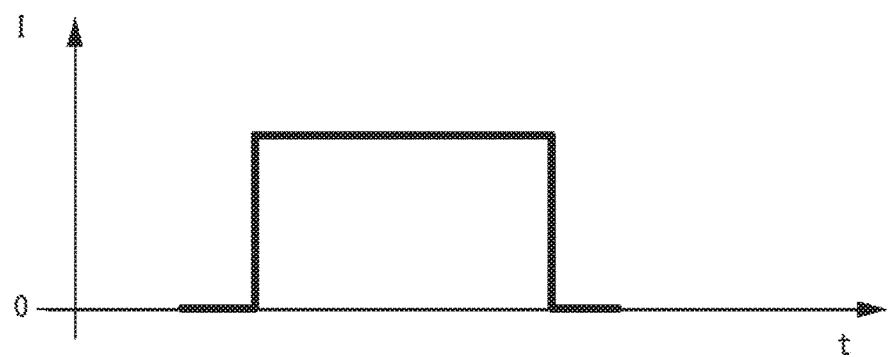
FIG. 1 is an explanatory diagram schematically illustrating a relationship between time and weld current in a single stage current pass method in which current pass is performed only once.
Figure 2:
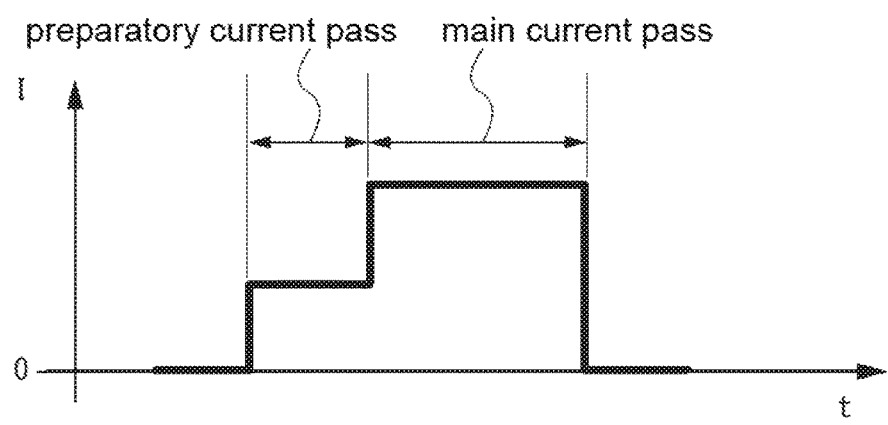
FIG. 2 is an explanatory diagram schematically illustrating a relationship between time and weld current in a current pass method of Document 1.
Figure 5:
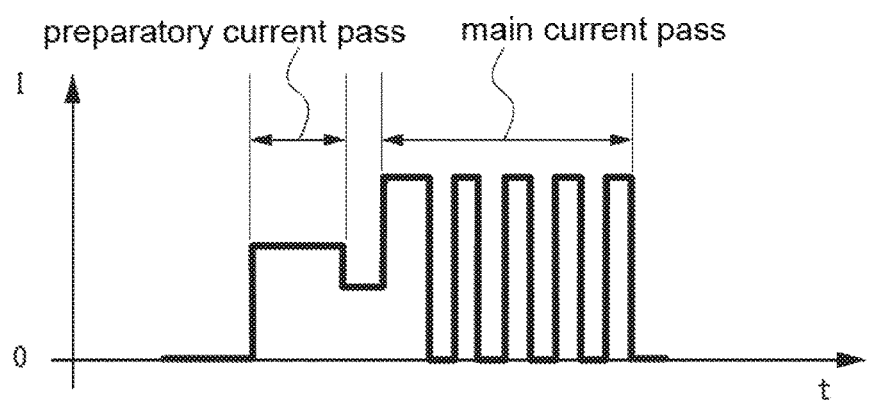
FIG. 5 is an explanatory diagram schematically illustrating a relationship between time and weld current in a current pass method of Document 3.
Figure 6:
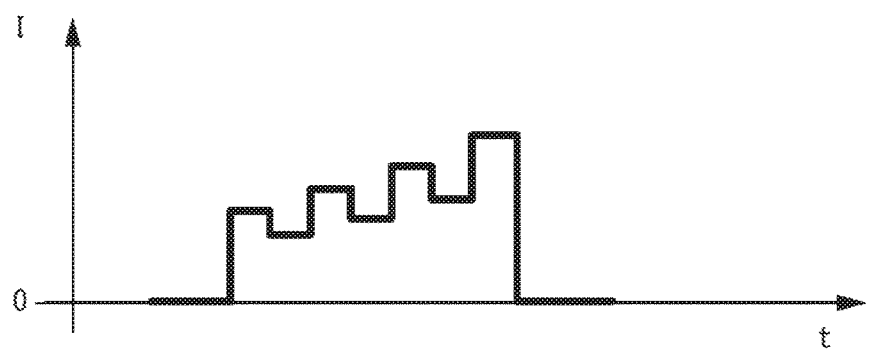
FIG. 6 is an explanatory diagram schematically illustrating a relationship between time and weld current in a current pass method of Document 4.
Figure 7:
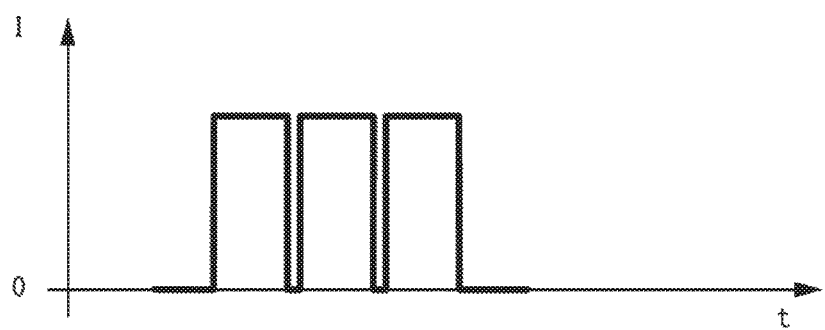
FIG. 7 is an explanatory diagram schematically illustrating a relationship between time and weld current in a current pass method of Document 5.

Explanation follows regarding a resistance spot welding method according to an exemplary embodiment of the present invention. In FIG. 9, FIG. 10A to FIG. 10H, and FIG. 11A to FIG. 11G, I on the vertical axis indicates the welding current, and t on the horizontal axis indicates time.

Recently, the usage is increasing of various high tensile steel sheets as automotive materials, in order to achieve lighter weight vehicle bodies and to improve crash safety. The application of hot stamping (a method in which, after heating steel sheet to a hardenable temperature and converting into austenite, pressing is performed in a mold at the same time as cooling and quenching) is becoming widespread, and most ultra-high strength pressed components having a tensile strength of from 1200 to 2000 MPa are manufactured by hot stamping.

Sometimes the surface of steel sheets used in hot stamping, rather than being un-plated, is surface treated in order to prevent iron scale from being generated when heated to a high temperature, such as by zinc-based-plating, aluminum-based-plating, or the like. Hot stamped steel sheets are, in many cases, molded bodies that have been molded rather than flat sheets, and in the present invention, "hot stamped steel sheets" includes molded bodies. Moreover, sometimes in the following explanation hot stamped steel sheets obtained by hot stamping zinc-based-plated steel sheets and aluminum-based-plated steel sheets are referred to as "surface treated hot stamped steel sheets".

When hot stamped steel sheets are spot welded with a spot welding machine with an inverter direct current source, in contrast to with soft steel sheets, sputter is generated at lower current values than when a single phase alternating current source is employed, leading to the phenomenon of narrowing appropriate current range. This phenomenon occurring, for example, in spot welding of aluminum plated hot stamped steel sheets, has been reported in document "Schweissen Schneiden by LAURENZ et al, 64-10 (2012), 654-661) (sometimes referred to below as "Document 6"), however there have not been any reports of fundamental solutions thereto.

In particular, with surface treated hot stamped steel sheets, when spot welding is performed with a spot welding machine with an inverter direct current source, internal sputter and surface sputter are liable to occur, and the appropriate current range is significantly narrowed. The nugget diameter that can be obtained without generating sputter therefore also becomes smaller.

Although the causes of the above are not clear, the occurrence of internal sputter is thought be as follows. With surface treated hot stamped steel sheets, due to an alloying reaction occurring between the zinc based-plating skin or aluminum based-plating skin, and the steel base material, a solid solution of inter-metal compound and base iron is formed on the surface thereof, and there is also an oxide skin present on the outer surface that has a principle component of a metal derived from the plating (for example, zinc in the case of zinc-based-plating). This accordingly makes the resistance at the contact portions between steel sheets higher in surface treated hot stamped steel sheets than in un-treated steel sheets, leading to a large amount of heat generation.

However, as alloying of the plating and the steel progresses during the hot stamp process, the melting point at the vicinity of the surface becomes a high value near to that of iron, and so contact portions between the steel sheets are less easily softened than the steel sheets prior to heating that have plating skins present, suppressing the current pass path from spreading out. In particular, due to the heat generation efficiency being higher in an inverter direct current method due to the current being continuously input than with a single phase alternating current, the formation of nuggets in the initial stage of a current pass is extremely rapid. It is hypothesized that, for this reason, the growth of pressure welding portions at the periphery of the nuggets does not keep pace, so that the molten metal can no longer be contained, and leading to the generation of internal sputter.

Regarding the causes of surface sputter generation, these are thought to be similar to the causes of the occurrence of internal sputter described above. Moreover, in an inverter direct current method, due to the current being continuously input, there is no current stop time like that in a single phase alternating current, and a cooling effect from the electrodes is difficult to obtain. It is accordingly hypothesized that the nuggets readily grow in the sheet thickness direction, and the molten portion reaches the outermost layer of the steel sheet, leading to surface sputter occurring.

With surface treated hot stamped steel sheets, it is thought that internal sputter and surface sputter are readily generated due to the surface state described above, and the appropriate current range is often less than 1 kA in cases in which the applied pressure is low. However, in reality there has been hardly any investigation into resistance spot welding methods of sheet assemblies including a surface treated hot stamped steel sheet.

When the methods of Documents 1 to 5 are applied to surface treated hot stamped steel sheets, the following deficiencies arise.

In the method of Document 1, which is a resistance spot welding method for high tensile steel sheets, due to the current value that can be applied to surface treated hot stamped steel sheets without sputter occurring in a preparatory current pass being low, the current pass path spreads out at the interface between the steel sheets and the current density falls, and so there is not a sufficient sputter generation suppressing effect. Thus cases have been found of internal sputter and surface sputter occurring when the current value is raised for the main current pass, and it has been difficult to secure a sufficient appropriate current range.

In the methods of Documents 2 and 3, similarly to the method of Document 1, the current value that can be applied to surface treated hot stamped steel sheets without sputter occurring in a preparatory current pass is low. The upper limit of the preparatory current pass value is higher than that of Document 1, however cases have been found of internal sputter occurring when the current value is raised for the main current pass, and it has been difficult to secure a sufficient appropriate current range.

In the method described in Document 4, there is an effect of widening the appropriate current range for steel material up to 980 MPa grade tensile strength, however internal sputter and surface sputter readily occur when the current is raised for the second and third time for surface treated hot stamped steel sheets that have a higher strength, and this current pass pattern is not suitable for welding surface treated hot stamped steel sheets.

In the current pass method described in Document 5, a current pass is six cycles (120 milliseconds) even in the shortest case. For surface treated hot stamped steel sheets, the upper limit current cannot be raised by using this current pass method since internal sputter is generated in a current pass time shorter than six cycles. The upper limit current value is raised when the current pass time is made shorter in each pulse, however the lower limit current value is also raised due to the drop in heat generation efficiency, and as a result, the appropriate current range cannot be widened. This method is therefore also not appropriate.

However, in contrast thereto, in the resistance spot welding method of the present exemplary embodiment, a wide appropriate current range is secured for high tensile steel sheets, including a surface treated hot stamped steel sheet, even when an inverter direct current source is employed.

Explanation first follows regarding a welding machine employed in the resistance spot welding method of the present exemplary embodiment.

Figure 8:
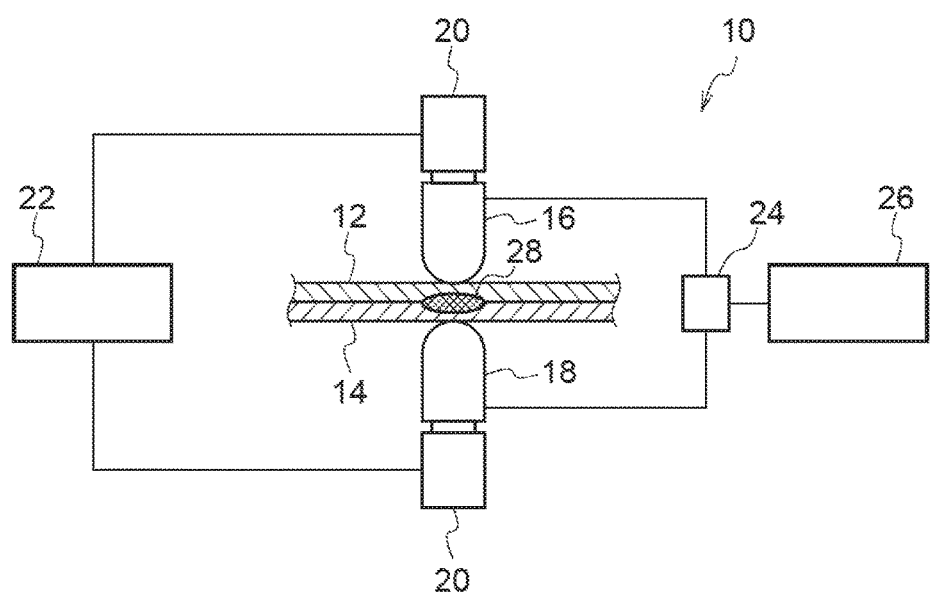
FIG. 8 is a schematic diagram illustrating a resistance spot welding apparatus according to an exemplary embodiment of the present invention.

As illustrated in FIG. 8, a welding machine 10 includes electrodes 16, 18 that press and pass a welding current through overlapped steel sheets 12, 14, a pressing mechanism 20 that applies a specific weld force to the electrodes 16, 18, a press controller 22 that controls the weld force of the pressing mechanism 20, a welding power source 24 that applies current to the electrodes 16, 18, and a current controller 26 that controls the welding power source 24 and controls the current value applied to the electrodes 16, 18.

A sheet assembly that is the target for the resistance spot welding method of the present exemplary embodiment is two or more overlapped steel sheets, including at least one sheet of high tensile steel sheets of 590 MPa grade or higher. FIG. 8 illustrates an overlapped sheet assembly of the two steel sheets 12, 14, however three or more sheets may be employed. Ordinarily, in automobile vehicle body assembly resistance spot welding is performed for sheet assemblies of two or three overlapped steel sheets.

There is no particular limitation to the type of high tensile steel sheet, and, for example, precipitation hardened steels, DP steels, transformation induced plasticity (TRIP) steels, hot stamped steel sheets, and the like, that have a tensile strength of 590 MPa or greater, are applicable as the high tensile steel sheet. The resistance spot welding method of the present exemplary embodiment is applicable to a sheet assembly including a high tensile steel sheet having a tensile strength of 980 MPa or higher. In particular, application is preferably made to a sheet assembly including a high tensile steel sheet having a tensile strength of 1200 MPa or higher, and application is more preferably made to a sheet assembly including a high tensile steel sheet having a tensile strength of 1500 MPa or higher.

The steel sheets included in the sheet assembly may be cold-rolled steel sheets, or may be hot-rolled steel sheets. The steel sheets may be un-treated steel sheet or plated steel sheet, and there is no particular limitation to the type of plating. The resistance spot welding method of the present exemplary embodiment is applicable to various high tensile steel sheets, however, it is particularly applicable to surface treated hot stamped steel sheets.

There are no particular limitations to the sheet thickness of the high tensile steel sheets. For example, the sheet thickness of steel sheets employed in automotive components or vehicle bodies is from 0.6 to 3.2 mm, and the resistance spot welding method of the present exemplary embodiment is adequate for application across this range.

The welding machine 10 is a spot welding machine including the welding power source 24 using an inverter direct current method. In cases in which welding is performed on sheet assemblies including high tensile steel sheets such as hot stamped steel sheets, internal sputter and surface sputter is liable be generated at a lower current value in the welding power source 24 using an inverter direct current method than with a welding power source using a single phase alternating current method. The resistance spot welding method of the present exemplary embodiment is applied to the welding machine 10 that employs the spot welding power source using such an inverter direct current method.

The pressing mechanism 20 for the electrodes 16, 18 of the welding machine 10 may be one that presses using a servomotor, or may be one that presses using air. The shape of the gun employed may also be a static-type, a C-type, or an X-type. There are no particular limitations to the weld force applied during welding, however, the weld force is preferably controlled by the press controller 22 to from 200 to 600 kgf. During spot welding, a constant weld force may be applied, or the weld force may be changed for each of the processes, described later.

There are no particular limitations to the electrodes 16, 18 and, for example, dome radius (DR) type electrodes with an outer-circumferential radius of curvature from 6 to 8 mm may be employed. A most typical example is DR-type electrodes having an outer-circumferential radius of 6 mm, and a tip radius of curvature of 40 mm. The electrode substance may be chromium copper, or alumina dispersion strengthened copper, and is preferably alumina dispersion strengthened copper from the perspective of preventing welding to the workpiece and surface sputter.

Next, explanation follows regarding a resistance spot welding method performed using the welding machine 10.

Under control by the press controller 22, the electrodes 16, 18 clamp the sheet assembly of the overlapped steel sheet 12 and steel sheet 14 with a specific weld force, and a weld current pass from the welding power source 24 is passed through the steel sheets 12, 14 via the electrodes 16, 18 using a current pass method controlled by the current controller 26.

In the current pass method, as illustrated in FIG. 9, first, a pulse wave current pass of current value I0 and a current pass time of t0 is performed three times (see pulses P1 to P3 in FIG. 9). When this is being performed, a stop time t1 in which current is not passed is constant between each pulse. After elapse of a stop time t2, in which current is not passed after the final pulse P3 in the pulsation process (sometimes referred to below as "final stop time"), a continuous current pass process is then performed, as described later.

The pulsation process is from the rise of the first pulse P1, to the end of the final stop time t2.

"Pulse" in the present exemplary embodiment includes sloped and saw-tooth shaped pulses illustrated in the examples of variations described later (see FIG. 10D and FIG. 10E).

When the final stop time t2 has elapsed after the end of current passing in the final pulse P3 of the pulsation process, a continuous current is passed from the electrodes 16, 18 through the steel sheets 12, 14 at a current value I1 that is lower than the current value I0 of the pulses P1 to P3, and over a current pass time t3 longer than the (maximum) current pass time t0 of each of the pulses P1 to P3, and a specific nugget 28 is formed at the interface between the steel sheets 12, 14.

In the pulsation process of the present exemplary embodiment, the pulses P1 to P3 correspond to "current passing in the pulsation process" of the present invention. The range of the stop times t1 and the range of the final stop time t2 in the pulsation process of the present exemplary embodiment each correspond to "current pass stopping of the pulsation process" of the present invention. Moreover, the range of the stop time t1 between the pulse P1 and P2, and P2 and P3, in the present exemplary embodiment correspond to the "current pass stop" between adjacent current passes in the present invention, and the range of the final stop time t2 of the present exemplary embodiment corresponds to the "final current pass stop" of the present invention.

Moreover, the continuous current pass process is performed after the pulsation process of the present invention, as in the present exemplary embodiment, however, the final current pass stop of the pulsation process is always positioned prior to the continuous current pass process.

Performing resistance spot welding with such a current pass method obtains the following advantageous effects.

In the pulsation process, the current pass time, the stop time, and the number of pulses is adjusted according to the type of material, sheet thickness, and sheet assembly. The resistance spot welding method of the present exemplary embodiment enables the conformity between the contact faces of the steel sheets to be raised in a short period of time by first providing the pulsation process.

In particular, in cases in which surface treated hot stamped steel sheets covered with a high electrical resistance skin, such as of zinc oxide, the high melting point oxide layer can be effectively removed from the outside of the weld portion due to being able to induce vibration in the contact faces by thermal expansion and contraction due to repetitions of current pass and current pass stop. Moreover, an electrode cooling effect can be made to work sufficiently due to repetitions of current pass and stop in the pulsating current pass, enabling a rapid rise in the temperature of the nugget 28 to be suppressed, and thereby enabling the advantageous effect of raising the conformity between the contact faces of the steel sheets 12, 14 in a short period of time, while suppressing the generation of internal sputter and surface sputter.

The current pass time t0 of each of the pulses P1 to P3 in the pulsation process is preferably 10 milliseconds to 60 milliseconds. When the current pass time t0 is less than 10 milliseconds, the heating time is short, and there is insufficient heat generation at the contact faces of the steel sheets 12, 14. When the current pass time t0 exceeds 60 milliseconds, the heating time is too long, and there is a concern of raising the probability of surface sputter and internal sputter being generated. The current pass time t0 is more preferably 15 milliseconds or longer. The current pass time t0 is more preferably 45 milliseconds or shorter, with 25 milliseconds or shorter being even more preferable.

The current value TO of the weld current in the pulsation process is preferably from 7.0 to 14.0 kA. Normally when the current pass time is increased in pulsation, this results in sputter being generated at low current values, and so preferably the current value is appropriately adjusted in the pulsating current pass so as to be in a range of 7.0 to 14.0 kA in consideration of the balance with the current pass time.

The stop times t1 in the pulsation process, excluding the final stop time t2, are preferably each from 10 milliseconds to 60 milliseconds each time. When the stop times t1 are less than 10 milliseconds, the stops are short, and cooling of the steel sheets 12, 14 is insufficient, leading to a concern regarding internal sputter and surface sputter generation. However, when the stop times t1 exceed 60 milliseconds, there is too great a cooling effect from the electrodes 16, 18, leading to a concern regarding a drop in the formation amount of the nugget 28 in the subsequent continuous current pass process. The stop times t1 are preferably 15 milliseconds or longer. The stop times t1 are more preferably 45 milliseconds or shorter, and are even more preferably 25 milliseconds or shorter.

The final stop time t2 in the pulsation process is preferably from 10 milliseconds to 120 milliseconds. When the final stop time t2 is less than 10 milliseconds, there is insufficient cooling of the nugget 28, such that sputter is generated at a low current value during the continuous current pass process. However, when the final stop time t2 exceeds 120 milliseconds, the nugget 28 is cooled too much, raising the current value in the continuous current pass to obtain the standard nugget diameter giving a specific joint strength, and resulting in a narrow appropriate current range. The final stop time t2 is more preferably 15 milliseconds or longer. The final stop time t2 is more preferably 100 milliseconds or shorter, and is even more preferably 60 milliseconds or shorter.

By providing the pulsation process as a preparatory current pass in this manner, current pass can be repeated, while interspersing the cooling effect of the electrodes 16, 18. Accordingly, while suppressing generation of sputter due to rapid growth of the nugget 28 at the contact faces of the steel sheets 12, 14, the conformity of the high tensile steel sheet to the other steel sheet can be promoted, enabling an increase in the current path at the interfaces between the steel sheets to be achieved.

Thus by inserting the continuous current pass process after the pulsation process, a drop in current density due to an increase in current path between the steel sheets 12, 14 is suppressed, and generation of sputter is suppressed by suppressing the rise in temperature at the contact portions between the steel sheets, even in cases in which the continuous current pass is for a longer period of time than the (maximum) current pass time t1 of the respective pulses P1 to P3 in the pulsation process. Namely, the current value at which sputter is generated is raised.

Moreover, after growth of the nugget 28 has started in the pulsation process, by passing current in the continuous current pass process for the current pass time t3 that is longer than the current pass time t1 of each of the pulses in the pulsation process, the nugget 28 grows to the specific standard nugget diameter at a lower current value than when a single current pass is employed (see FIG. 1).

As a result, in the resistance spot welding method of the present exemplary embodiment, the appropriate current range is increased in the continuous current pass process.

Reference here to the appropriate current range indicates a range defined by a lower limit of a current value that produces a standard nugget diameter of $4t^{1/2}$ (wherein t is the sheet thickness (mm), also referred to below as "$4\sqrt{t}$") capable of obtaining a specific weld strength, and with an upper limit of the maximum current value at which sputter (expulsions) are not generated. The sheet thickness t is the thickness (mm) of one steel sheet out of the two steel sheets in which the nugget is formed. In cases in which the thicknesses of the two steel sheets are different from each other, the sheet thickness t is that of the thinner steel sheet. Moreover, in cases in which there are three or more overlapped steel sheets, the sheet thickness t is the thinner of the steel sheets from out of two steel sheets in which the nugget diameter is measured.

Thus employing the resistance spot welding method according to the present exemplary embodiment enables stable resistance spot welding to be performed, even for steel sheets including a surface treated hot stamped steel sheet that is liable to sputter generation.

The resistance spot welding method according to the present exemplary embodiment enables the quality of the external appearance of a product to be raised by suppressing sputter generation. Moreover, the operational availability of robots can be raised due to being able to prevent sputter from adhering to movable parts of a welding robot. An improvement in productivity can also be achieved due to being able to omit post-processing that accompanies sputter generation, such as burr removal.

The number of pulses (current passes) in the pulsation process is at least two or more. This is because an advantageous effect of suppressing sputter generation is not obtainable unless there are two or more pulses when employing a surface treated hot stamped steel sheet. The number of pulses is more preferably three or more. Generally, the number of pulses should be increased as the total sheet thickness of the sheet assembly increases. However, due to a tendency for saturation of the advantageous effect when there are more than nine pulses, the number of pulses is preferably nine times or less.

In cases in which application is made to a surface treated hot stamped steel sheet that is liable to sputter generation, in the pulsation process, for example, preferably current passes at from 7.5 kA to 12 kA for 16.6 milliseconds (one cycle at 60 Hz) to 20 milliseconds (one cycle at 50 Hz) and stops are performed repeatedly from three to seven times.

The resistance spot welding method of the present exemplary embodiment includes the continuous current pass process after the pulsation process. If only the pulsation process is employed, even if the current path can be increased, there is only a small effect on increasing the nugget diameter; however, by providing the continuous current pass process after the pulsation process, heat generation is promoted at the interface between the steel sheets 12, 14, enabling the nugget 28 to be formed at sufficient size without causing internal sputter and surface sputter to be generated.

In the continuous current pass process, the current pass time t3 is preferably a continuous current pass performed for from 100 milliseconds to 500 milliseconds. When the current pass time t3 in the continuous current pass process is less than 100 milliseconds, the time is insufficient to enlarge the nugget 28 and an effect is not obtained. When the current pass time t3 exceeds 500 milliseconds, there is saturation in the effect to enlarge the nugget 28, leading to an increase in the takt time. The current pass time t3 in the continuous current pass process is more preferably 120 milliseconds or longer, and is more preferably 400 milliseconds or shorter.

The current value I1 in the continuous current pass process is preferably from 5.0 kA to 12.0 kA. The current value I1 in the continuous current pass process is preferably the maximum current value I0 in the pulsation process or lower. Making the current value I1 in the continuous current pass process lower than the maximum current value I0 in the pulsation process is done in order to suppress the generation of sputter. In a continuous current pass process, the current value does not necessarily need to be constant, and a change may be made to the current value during the continuous current pass process, and an upslope or a down slope of from 16 milliseconds to 60 milliseconds may be included.

Figure 11A:
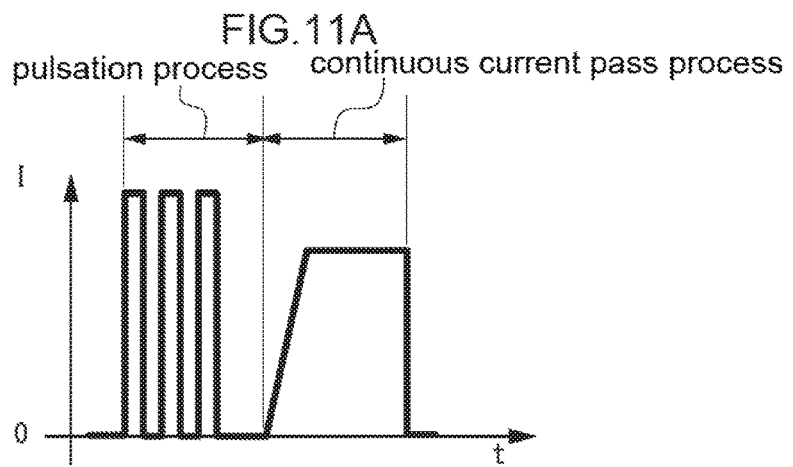
FIG. 11A is an explanatory diagram schematically illustrating a relationship between time and weld current of a variation of a continuous current pass method in a resistance spot welding method according to an exemplary embodiment of the present invention.
Figure 11B:
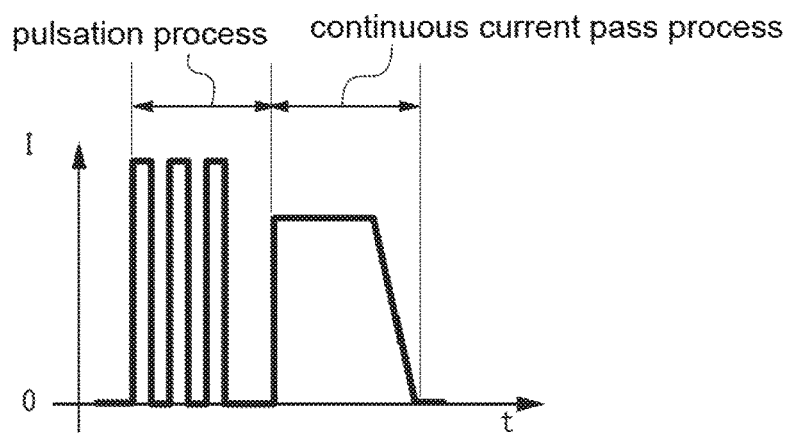
FIG. 11B is an explanatory diagram schematically illustrating a relationship between time and weld current of a variation of a continuous current pass method in a resistance spot welding method according to an exemplary embodiment of the present invention.
Figure 11C:
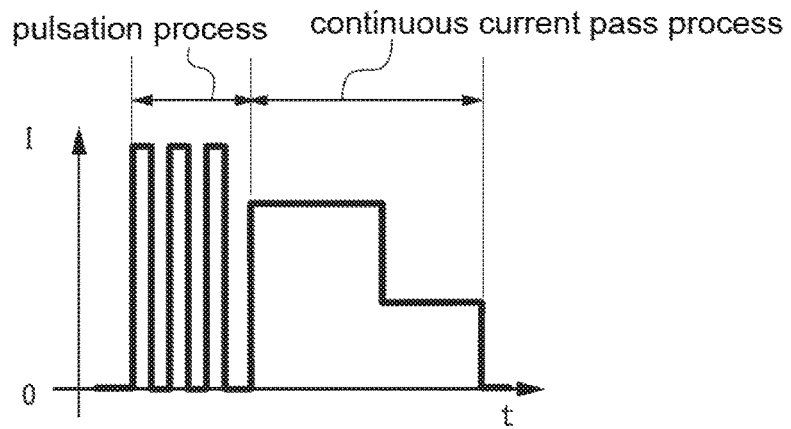
FIG. 11C is an explanatory diagram schematically illustrating a relationship between time and weld current of a variation of a continuous current pass method in a resistance spot welding method according to an exemplary embodiment of the present invention.
Figure 11D:
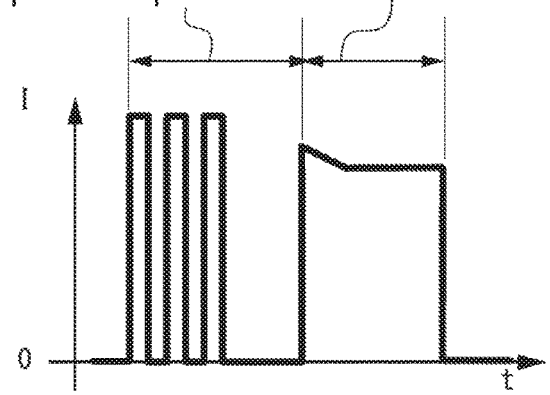
FIG. 11D is an explanatory diagram schematically illustrating a relationship between time and weld current of a variation of a continuous current pass method in a resistance spot welding method according to an exemplary embodiment of the present invention.
Figure 11E:
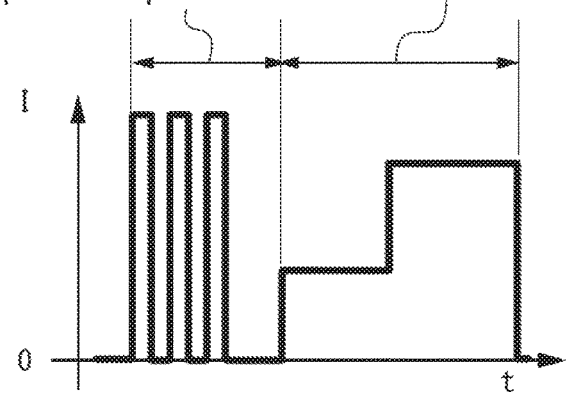
FIG. 11E is an explanatory diagram schematically illustrating a relationship between time and weld current of a variation of a continuous current pass method in a resistance spot welding method according to an exemplary embodiment of the present invention.
Figure 11F:
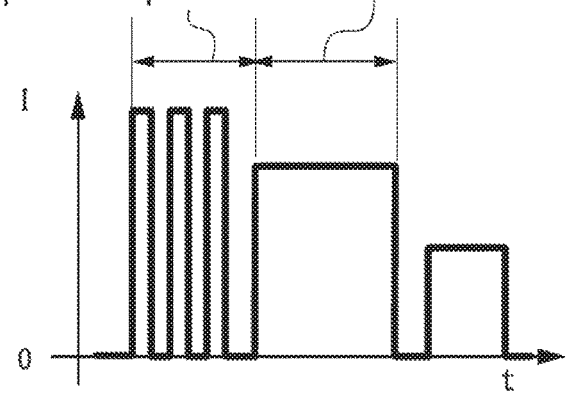
FIG. 11F is an explanatory diagram schematically illustrating a relationship between time and weld current of a variation of a continuous current pass method in a resistance spot welding method according to an exemplary embodiment of the present invention.
Figure 11G:
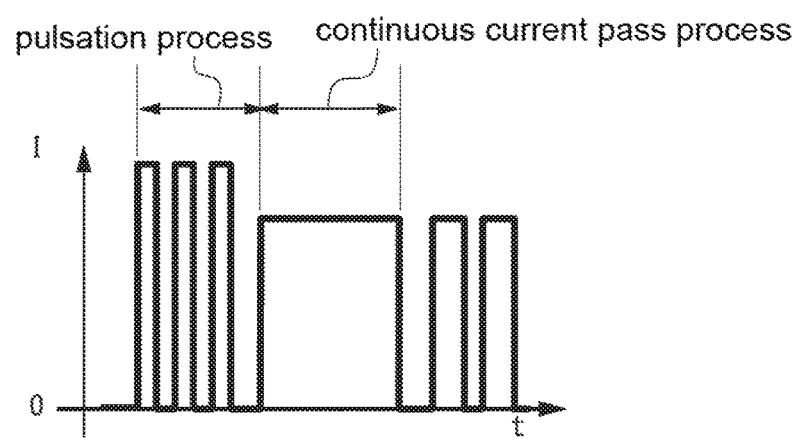
FIG. 11G is an explanatory diagram schematically illustrating a relationship between time and weld current of a variation of a continuous current pass method in a resistance spot welding method according to an exemplary embodiment of the present invention.

When using a high tensile steel sheet, such as a hot stamped steel sheet, a further single current pass or pulsating current pass may be performed after the continuous current pass process, in order to control the cooling process and to raise the toughness of the nugget 28 (see FIG. 11F, FIG. 11G). Performing another current pass after the continuous current pass process has the advantages of raising the toughness of the nugget 28 by alleviating solidification segregation of phosphorous in the nugget 28, and by transforming the nugget 28 into a tempered martensite structure, enabling the spot weld joint strength to be raised.

In the resistance spot welding method according to the present exemplary embodiment, a further holding process of pressing by the electrodes 16, 18 without current flowing may be provided after the pulsation process and the continuous current pass process described above have finished. Provision of the holding process enables solidification fracture within the nugget 28 to be suppressed. There are no particular limitations to the holding time when the holding process is provided; however, since the takt time increases when the holding time is too long, the holding time is preferably 300 milliseconds or shorter.

The current value T0, the current pass time t0, and the stop time t1 for each of the pulses P1 to P3 in the pulsation process may be constant, or they may vary for each pulse.

Namely, when resistance spot welding is performed on steel sheets in a two-sheet assembly, there is no limitation to a configuration in which, as in the present exemplary embodiment, the current pass time for each of the pulses in the pulsation process and the current pass stop time between each of the pulses is constant, and the current value of each of the pulses is constant.

Figure 10A:
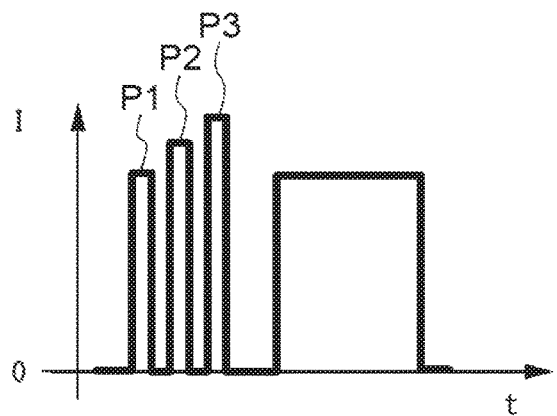
FIG. 10A is an explanatory diagram schematically illustrating a relationship between time and weld current of a variation of a pulsation process current pass method in a resistance spot welding method according to an exemplary embodiment of the present invention.

For example, as illustrated in FIG. 10A, control may be performed such that the current value rises after the first pulse P1 on progression through the pulses P2, P3. Moreover, as illustrated in FIG. 10D, the rising portion of the first pulse P1 may be sloped. Moreover, as illustrated in FIG. 10E, the rising sides of each of the pulses P1 to P3 may be sloped so as to give a saw-tooth shape. Moreover, as illustrated in FIG. 10G a first stop time t11 between the first pulse P1 and the second pulse P2 may be configured alone so as to be longer than another stop time t12, increasing the electrode cooling effect on the first pulse P1 compared to that on the other pulse P2.

Employing such a current pass method in the pulsation process suppresses a rapid growth of the nugget 28 in the pulsation process (suppresses a rapid temperature rise in this portion), enabling the generation of internal sputter and surface sputter to be suppressed.

Figure 10B:
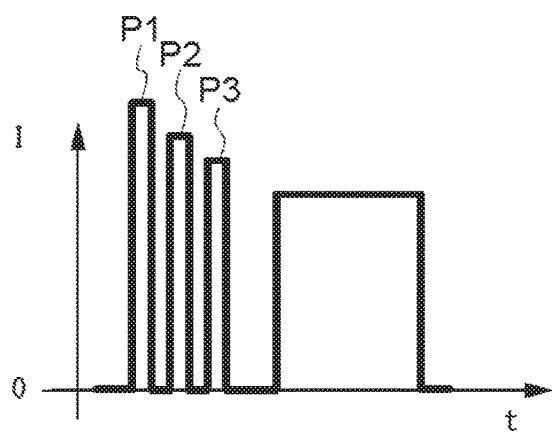
FIG. 10B is an explanatory diagram schematically illustrating a relationship between time and weld current of a variation of a pulsation process current pass method in a resistance spot welding method according to an exemplary embodiment of the present invention.
Figure 10C:
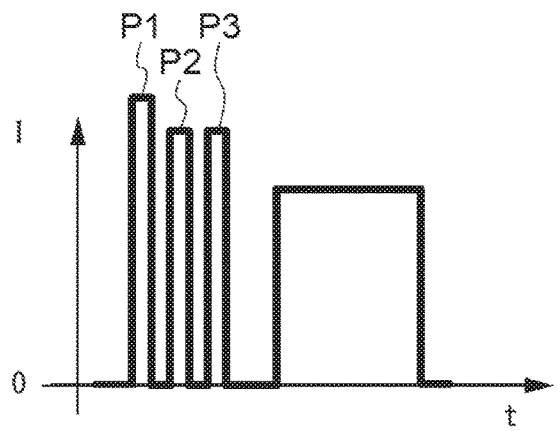
FIG. 10C is an explanatory diagram schematically illustrating a relationship between time and weld current of a variation of a pulsation process current pass method in a resistance spot welding method according to an exemplary embodiment of the present invention.
Figure 10D:
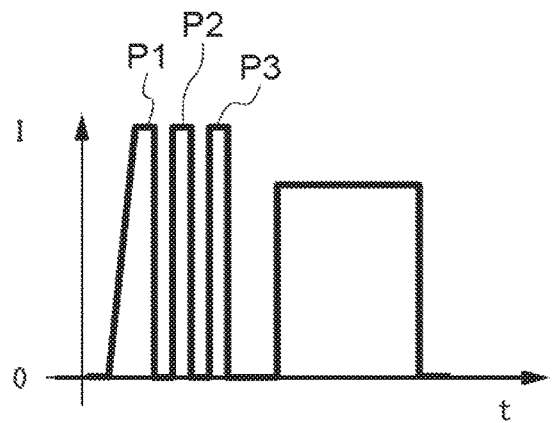
FIG. 10D is an explanatory diagram schematically illustrating a relationship between time and weld current of a variation of a pulsation process current pass method in a resistance spot welding method according to an exemplary embodiment of the present invention.
Figure 10E:
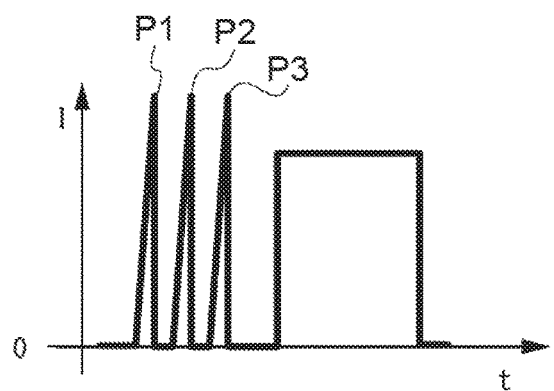
FIG. 10E is an explanatory diagram schematically illustrating a relationship between time and weld current of a variation of a pulsation process current pass method in a resistance spot welding method according to an exemplary embodiment of the present invention.
Figure 10F:
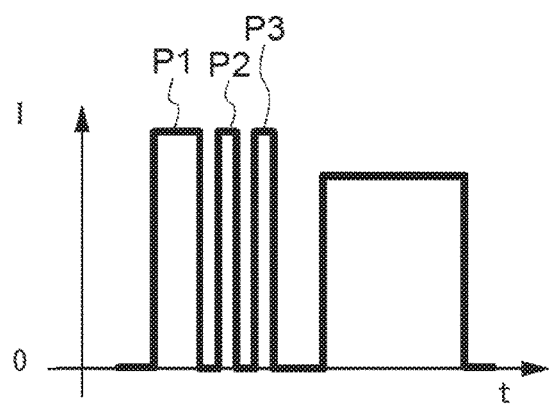
FIG. 10F is an explanatory diagram schematically illustrating a relationship between time and weld current of a variation of a pulsation process current pass method in a resistance spot welding method according to an exemplary embodiment of the present invention.
Figure 10G:
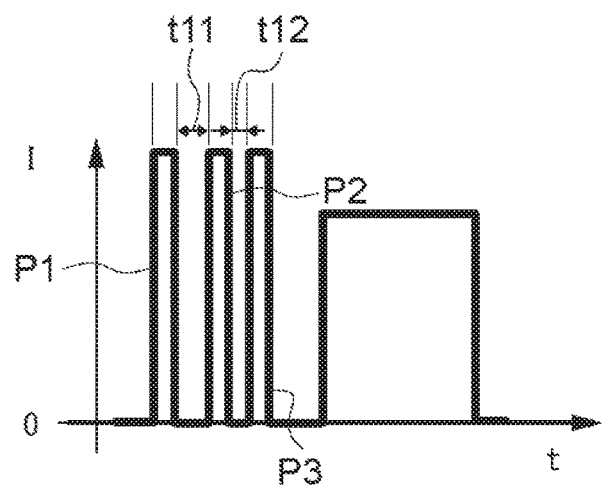
FIG. 10G is an explanatory diagram schematically illustrating a relationship between time and weld current of a variation of a pulsation process current pass method in a resistance spot welding method according to an exemplary embodiment of the present invention.
Figure 10H:
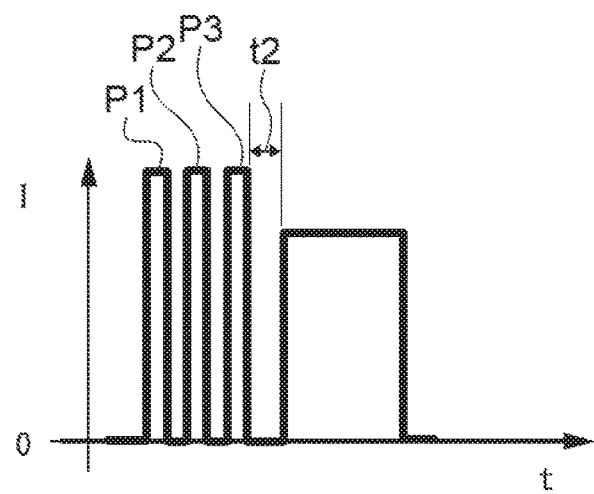
FIG. 10H is an explanatory diagram schematically illustrating a relationship between time and weld current of a variation of a pulsation process current pass method in a resistance spot welding method according to an exemplary embodiment of the present invention.

Moreover, for example, as illustrated in FIG. 10H, a configuration may be considered in which the final stop time t2 (the current pass stop time between the final pulse P3 and the continuous current pass process) is shorter than in the other examples (see FIG. 10A to FIG. 10G). By making the final stop time t2 shorter in this manner, excessive cooling of the steel sheets 12, 14 by the electrodes 16, 18 is suppressed, enabling the electrical energy imparted to the steel sheets (for example, the current pass time and the current value) during the continuous current pass to be suppressed.

Moreover, in cases in which resistance spot welding is performed to a three-sheet assembly of steel sheets in which a thin sheet is overlapped on the outside of two thick sheets, the following variation of the current pass method may be considered in the pulsation process.

For example, as illustrated in FIG. 10B, control may be performed so as to lower the current value from the first pulse P1 on progression toward the final pulse P3. Moreover, as illustrated in FIG. 10C, the first pulse P1 alone may have a current pass with a higher current value that those of the other pulses P2, P3. Moreover, as illustrated in FIG. 10F, the first pulse P1 alone may have a current pass time longer than current pass time of the other pulses P2, P3.

In this manner, the electrical energy imparted by the first pulse P1 to the three-sheet assembly of steel sheets is a higher electrical energy that that imparted in the other pulses P2, P3. Due to imparting high electrical energy at the point in time when there is a high contact resistance between the thin sheet and the thick sheet, this thereby enables a high temperature to be achieved in the thin sheet and the thick sheet, and a nugget to be grown there between.

Similarly, explanation follows regarding variations in the current pass method of the continuous current pass process of the resistance spot welding method of the present exemplary embodiment, with reference to FIG. 11A to FIG. 11G.

For example, as illustrated in FIG. 11A, by sloping the rise of the current waveform in the continuous current pass process, or, as illustrated in FIG. 11E, by setting a current value for the first half of the continuous current pass process lower than the current value of the latter half, a rapid rise in the temperature of the nugget 28 can be suppressed at the time when the continuous current pass is started, enabling the generation of internal sputter and surface sputter to be suppressed.

Moreover, there are configurations in which, as illustrated in FIG. 11B, the fall of the current waveform of the continuous current pass process is sloped, or in which, as illustrated in FIG. 11C, the current value of the latter half of the continuous current pass process is set lower than the current value of the first half. Adopting such an approach enables the strength of the weld joint to be raised, by gradually cooling after welding so as to change the characteristics of the metal structure of the weld portion.

Moreover, for example, as illustrated in FIG. 11F and FIG. 11G, there are also configurations in which, after the continuous current pass process, a single current pass is performed, or pulsating current pass is performed. This thereby improves the metal structure of the weld portion, and raises the strength of the weld joint.

Moreover, as illustrated in FIG. 11D, nugget growth is promoted between a thin sheet and a thick sheet by passing current through a sheet assembly of three overlapped sheets, these being a thin sheet, a thick sheet, and a thick sheet, with a high current value initially in the continuous current pass process.

EXAMPLES

Explanation follows regarding examples; however, the present invention is not limited to these examples.

Examples 1

The welding machine employed in the present examples is an inverter direct current spot welding machine that uses a servo press method, and includes DR-type electrodes (alumina dispersion strengthened copper) having an outer-circumferential radius of curvature of 6 mm, and a tip radius of curvature of 40 mm. The material to be welded is two overlapped sheets of aluminum-plated 1500 MPa grade hot stamped steel sheets (the plating amount prior to hot stamping was 40 g/m² per side, and the heating conditions are heating inside a gas furnace at 900° C. for 4 minutes) with a sheet thickness of 1.2 mm and a size of 30 mm×100 mm.

The welding methods are listed in Table 1. Although Test Nos. 6, 7 include a preparatory current pass prior to the continuous current pass process, they are tests in which a two stage current pass is performed without a stop time between the preparatory current pass and the continuous current pass processes. Test No. 8 is configured with a current pass stop time (34 milliseconds) between the preparatory current pass and the continuous current pass process. In both the examples of the present invention and the comparative examples, the weld force was a constant value (300 kgf) in the pulsation process or the preparatory current pass, and in the continuous current pass process.

In each of the tests, spot welding was performed by varying the current value of the continuous current pass process while keeping the conditions of the pulsation process or the preparatory current pass constant, the minimum current value ($4\sqrt{t}$ current) is found at which the nugget diameter, this being the determinant of weld joint strength, reaches $4\sqrt{t}$ (wherein t is the sheet thickness in mm)=4.3 mm or greater, and the maximum current value (maximum sputter-less current) is found at which sputter (internal sputter and surface sputter) is not generated. The range from the $4\sqrt{t}$ current value to the maximum sputter-less current value, namely the range of current values for the continuous current pass process such that sputter is not generated, while still forming a nugget that imparts a specific strength to the weld joint, is the appropriate current range. The test results are illustrated in Table 1.

Regarding the nugget diameter, after spot welding, destructive testing was performed using a chisel, and the fracture was measure with Vernier calipers. The presence or absence of the occurrence of sputter was confirmed by eye during spot welding.

TABLE 1

| | Pulsation Process | | | | | Test Results (current values of continuous current pass process) | | | | |
|---|---|---|---|---|---|---|---|---|---|---|
| Test No. | Weld current (kA) | Current pass time (msec) | Current stop time - other than final (msec) | Final current stop time (msec) | Number of pulses (times) | Continuous current pass process Current pass time (msec) | $4\sqrt{t}$ current (kA) | Maximum sputter-less current (kA) | Appropriate current range (kA) | Comment |
| 1 | 8.5 | 17 | 17 | 17 | 3 | 133 | 5.5 | 8.0 | 2.5 | Examples of present invention |
| 2 | 8.5 | 17 | 17 | 60 | 3 | 133 | 5.5 | 8.2 | 2.7 | |
| 3 | 7.5 | 34 | 34 | 34 | 3 | 133 | 5.8 | 8.5 | 2.7 | |
| 4 | 7.5 | 17 | 17 | 51 | 9 | 133 | 4.6 | 7.8 | 3.2 | |
| 5 | — | — | — | — | — | 250 | 5.0 | 5.5 | 0.5 | Comparative Examples |
| 6 | Preliminary current of 5.0 kA for 83 msec | | | | | 133 | 5.8 | 6.2 | 0.4 | |
| 7 | Preliminary current of 5.0 kA for 83 msec | | | | | 250 | 5.2 | 6.0 | 0.8 | |
| 8 | Preliminary current of 5.0 kA for 83 msec + 34 msec stop | | | | | 250 | 5.5 | 6.5 | 1.0 | |

As illustrated in Table 1, the appropriate current ranges of the Test Nos. 1 to 4 of the examples of the present invention that include the pulsation process are three times wider or more than those of the Test Nos. 5 to 7 of the comparative examples that either do not have a preparatory current pass, or do have a preparatory current pass but do not have a stop time provided between the preparatory current pass and the continuous current pass. Moreover, it was confirmed that the appropriate current ranges of the Test Nos. 1 to 4 of the examples of the present invention that include the pulsation process (plural repetitions of current passing and stopping) are two times wider or more than those of the comparative example Test No. 8 that has a stop time provided between the preparatory current pass and the continuous current pass.

Examples 2

The welding machine employed in the present examples is the same as that of Examples 1. The material to be welded was three overlapped sheets, these being a GA-plated 270 MPa grade steel sheet with a sheet thickness of 0.7 mm and a size of 30 mm×100 mm, a GA-plated 1500 MPa grade hot stamped steel sheet with a sheet thickness of 1.2 mm (the plating amount prior to hot stamping was 55 g/m² per side, and the heating conditions were the same as those of Examples 1), and an unplated 440 MPa grade steel sheet with a sheet thickness of 1.4 mm. The welding methods are listed in Table 2. The current pass methods of the comparative examples are similar to those of Examples 1. In both the examples of the present invention and the comparative examples, the weld force was a constant value (300 kgf) in the pulsation process or the preparatory current pass, and in the continuous current pass process.

Testing and evaluation of the test results were performed similarly to in the Examples 1.

The 4√t current value was determined in the following manner, due to the thickness being different in the three sheets. Namely, the minimum current value at which the nugget diameters at the respective interfaces between the steel sheets respectively satisfied 4√t (wherein t is the sheet thickness in mm of the thin plate side at an overlapped face) is the 4√t current value. Specifically, for the nugget at the interface between the steel sheet of sheet thickness 0.7 mm and the steel sheet of sheet thickness 1.2 mm, the nugget diameter is 4√t when it is $4\times(0.7)^{1/2}=3.4$ mm. For the nugget at the interface between the steel sheet of sheet thickness 1.2 mm and the steel sheet of sheet thickness 1.4 mm, the nugget diameter is 4√t when it is $4\times(0.7)^{1/2}=4.4$ mm) or greater. Thus the 4√t current value is the minimum current value at which the nugget diameters at both the interfaces are respectively 4√t or greater.

The test results are illustrated in Table 2.

TABLE 2

| | Pulsation Process | | | | | Continuous current pass | Test Results | | | |
|---|---|---|---|---|---|---|---|---|---|---|
| | | | | | | | | (current values of continuous current pass process) | | |
| Test No. | Weld current (kA) | Current pass time (msec) | Current stop time - other than final (msec) | Final current stop time (msec) | Number of pulses (times) | process Current pass time (msec) | 4√t current (kA) | Maximum sputter-less current (kA) | Appropriate current range (kA) | Comment |
| 1 | 12 | 17 | 17 | 17 | 3 | 282 | 5.8 | 8.6 | 2.8 | Examples of |
| 2 | 12 | 17 | 17 | 34 | 3 | 282 | 6.0 | 8.8 | 2.8 | present |
| 3 | 12 | 17 | 17 | 17 | 3 | 500 | 5.6 | 8.8 | 3.2 | invention |
| 4 | — | — | — | — | — | 282 | 5.8 | 6.6 | 0.8 | Comparative |
| 5 | Preliminary current of 5.0 kA for 83 msec | | | | | 282 | 5.8 | 6.6 | 0.8 | Examples |
| 6 | Preliminary current of 5.0 kA for 83 msec + 34 msec stop | | | | | 282 | 6.0 | 7.0 | 1.0 | |

As illustrated in Table 2, with the material to be welded of three overlapped sheets including hot stamped material too, it was confirmed that, similarly to in the Examples 1, the appropriate current ranges of the Test Nos. 1 to 3 of the present invention that include the pulsation process are almost three times wider (at 2.0 kA or more) than those of the Test Nos. 4 to 6 of comparative examples that either do not have a preparatory current pass, do have a preparatory current pass but do not have a stop time provided between the preparatory current pass and the continuous current pass, or do have a stop time provided between the preparatory current pass and the continuous current pass.

Examples 3

The welding machine employed in the present examples is an inverter direct current spot welding machine that uses an air press method, and includes DR-type electrodes (alumina dispersion strengthened copper) having an outer-circumferential radius of curvature of 6 mm, and a tip radius of curvature of 40 mm. The material to be welded was two overlapped sheets of furnace heated ZnO skin-treated Al-plated 1500 MPa grade hot stamped steel sheets having a sheet thickness of 1.6 mm and a size of 30 mm×100 mm. The welding methods are listed in Table 3. The current pass methods in the comparative examples are similar to those in Examples 1. The weld force in the examples of the present invention and the comparative examples was a constant value (350 kgf) in the pulsation process or the preparatory current pass, and in the continuous current pass process.

Testing and evaluation of the test results were performed similarly to in the Examples 1.

Test results are illustrated in Table 3.

TABLE 3

| | | Pulsation Process | | | | Continuous current pass | Test Results | | | |
|---|---|---|---|---|---|---|---|---|---|---|
| Test No. | Weld current (kA) | Current pass time (msec) | Current stop time - other than final (msec) | Final current stop time (msec) | Number of pulses (times) | process Current pass time (msec) | 4√t current (kA) | (current values of continuous current pass process) Maximum sputter-less current (kA) | Appropriate current range (kA) | Comment |
| 1 | 7.5 | 17 | 17 | 50 | 7 | 333 | 5.7 | 7.3 | 1.6 | Examples of present invention |
| 2 | 8.5 | 17 | 17 | 50 | 7 | 333 | 5.5 | 7.6 | 2.1 | |
| 3 | 9.5 | 17 | 17 | 50 | 7 | 333 | 5.5 | 7.2 | 1.7 | |
| 4 | 8.5 | 17 | 17 | 50 | 9 | 250 | 5.5 | 7.5 | 2.0 | |
| 5 | — | — | — | — | — | 333 | 5.7 | 6.4 | 0.7 | Comparative examples |
| 6 | — | — | — | — | — | 600 | 5.5 | 6.5 | 1.0 | |
| 7 | Preliminary current of 5.0 kA for 83 msec | | | | | 333 | 5.7 | 6.5 | 0.8 | |
| 8 | Preliminary current of 5.0 kA for 83 msec + 34 msec stop | | | | | 333 | 6.0 | 7.0 | 1.0 | |

The ZnO skin-treated Al-plated hot stamped steel sheet employed in the present examples was produced by the following method.

Cold-rolled steel sheet of sheet thickness 1.6 mm was Al-plated using a Sendzimir process. The annealing temperature when this was performed was about 800° C., and the Al-plating bath contained Si at 9%, and also contained Fe eluted from a steel strip. The plating amount was then adjusted to 40 g/m² per side using a gas wiping method. Water was atomized into a spray during cooling after plating in order to adjust the surface roughness of the Al-plating layer. After cooling the Al-plated steel sheet, a process liquid was coated thereon using a roll coater, and then fired at about 80° C. The process liquid had a base of a ZnO Slurry of a NANOTEK (registered trademark) slurry manufactured by CI Kasei Co. Ltd., to which were added a water soluble urethane resin as a binder at a maximum solid content of 30%, and carbon black for coloring at a maximum solid content of 10%. The adhered amount was measured by Zn content, and was set to 0.8 g/m². After steel sheets manufactured in this manner were heated in a furnace at 900° C. for 5 minutes in an atmosphere of air, they were quenched in a water cooled mold, to produce the test material.

As illustrated in Table 3, with the material to be welded of the two overlapped ZnO skin treated Al-plated hot stamped steel sheets too, similarly to in the Examples 1, the upper limit current values in the continuous current pass process (the maximum sputter-less current value) could be raised in the Test Nos. 1 to 4 of the present invention having a pulsation process, compared to those of the Test Nos. 5 to 8 of the comparative examples that either do not have a preparatory current pass, do have a preparatory current pass but do not have a stop time provided between the preparatory current pass and the continuous current pass, or have a stop time between the preparatory current pass and the continuous current pass, and a widening of the appropriate current range (to 1.5 kA or greater) was confirmed.

The entire content of the disclosure of Japanese Patent Application No. 2013-145380 filed on Jul. 11, 2013, is incorporated by reference in the present specification.

All publications, patent applications and technical standards mentioned in the present specification are incorporated by reference in the present specification to the same extent as if the individual publication, patent application, or technical standard was specifically and individually indicated to be incorporated by reference.

The invention claimed is:

1. A resistance spot welding method comprising:
providing a sheet assembly of two or more overlapping steel sheets including at least one high-tensile steel sheet, wherein each pair of the two or more overlapping steel sheets includes an interface in the area of overlap;
clamping the sheet assembly using a pair of welding electrodes that are connected to a spot welding power source employing an inverter direct current method;
performing a pulsation process comprising passing a pulse wave of current through said steel sheets, stopping current passage through said steel sheets, and repeating the passing of a pulse wave of current through said steel sheets and the stopping of current passage through said steel sheets, while pressing the steel sheets with the welding electrodes, thereby forming a nugget at the interface between the steel sheets, wherein a current value of the current passes in the pulsation process is from 7.0 kA to 14.0 kA and current passing times in the current passes in the pulsation process are each from 10 milliseconds to 60 milliseconds; and, after the pulsation process,
passing current continuously for a longer period of time than a current passing time of each repetition, while pressing the steel sheets with the welding electrodes and thereby growing the nugget.

2. The resistance spot welding method of claim 1, wherein a current pass time in the continuous current passing process is from 100 milliseconds to 500 milliseconds.

3. The resistance spot welding method of claim 2, wherein the current value of a current pass in the continuous current passing process is from 5.0 kA to 12.0 kA.

4. The resistance spot welding method of claim 3, wherein a maximum current value in the continuous current passing process is a maximum current value in the pulsation process or lower.

5. The resistance spot welding method of claim 1, wherein, in the pulsation process, current pass stop times between adjacent current passes are each from 10 milliseconds to 60 milliseconds.

6. The resistance spot welding method of claim 1, wherein, in the pulsation process, a final current pass stop time between a final current pass and the continuous current passing process is from 10 milliseconds to 120 milliseconds.

7. The resistance spot welding method of claim 1, wherein the high-tensile steel sheet is a hot stamped steel sheet having a surface covered with a zinc-based skin or an aluminum-based skin.

8. A resistance spot welding method comprising:
providing a sheet assembly of two or more overlapping steel sheets including at least one high-tensile steel sheet, wherein each pair of the two or more overlapping steel sheets includes an interface in the area of overlap;
clamping the sheet assembly using a pair of welding electrodes that are connected to a spot welding power source employing an inverter direct current method;
performing a pulsation process comprising passing a pulse wave of current through said steel sheets, stopping current passage through said steel sheets, and repeating the passing of a pulse wave of current through said steel sheets and the stopping of current passage through said steel sheets, while pressing the steel sheets with the welding electrodes, thereby forming a nugget at the interface between the steel sheets, wherein current passing times in the current passes in the pulsation process are each from 10 milliseconds to 60 milliseconds; and, after the pulsation process,
passing current continuously for a longer period of time than a current passing time of each repetition, while pressing the steel sheets with the welding electrodes and thereby growing the nugget, wherein a current value of a current pass in the continuous current passing process is from 5.0 kA to 12.0 kA and a current pass time in the continuous current passing process is from 100 milliseconds to 500 milliseconds.

9. The resistance spot welding method of claim 8, wherein, in the pulsation process, current pass stop times between adjacent current passes are each from 10 milliseconds to 60 milliseconds.

10. The resistance spot welding method of claim 8, wherein, in the pulsation process, a final current pass stop time between a final current pass and the continuous current passing process is from 10 milliseconds to 120 milliseconds.

11. The resistance spot welding method of claim 8, wherein the high-tensile steel sheet is a hot stamped steel sheet having a surface covered with a zinc-based skin or an aluminum-based skin.

* * * * *